(12) United States Patent
Hapsari et al.

(10) Patent No.: US 9,215,629 B2
(45) Date of Patent: Dec. 15, 2015

(54) MOBILE COMMUNICATION METHOD

(75) Inventors: Wuri Andarmawanti Hapsari, Yokosuka (JP); Hideaki Takahashi, Yokohama (JP); Anil Umesh, Yokohama (JP); Mikio Iwamura, Minato-ku (JP); Minami Ishii, Yokohama (JP); Takeshi Okamoto, Yokosuka (JP)

(73) Assignee: NTT DOCOMO, INC., Tokyo (JP)

( * ) Notice: Subject to any disclaimer, the term of this patent is extended or adjusted under 35 U.S.C. 154(b) by 256 days.

(21) Appl. No.: 13/391,146

(22) PCT Filed: Aug. 11, 2010

(86) PCT No.: PCT/JP2010/063603
§ 371 (c)(1),
(2), (4) Date: May 7, 2012

(87) PCT Pub. No.: WO2011/021547
PCT Pub. Date: Feb. 24, 2011

(65) Prior Publication Data
US 2012/0230296 A1    Sep. 13, 2012

(30) Foreign Application Priority Data

Aug. 18, 2009    (JP) .................................. 2009-189598

(51) Int. Cl.
*H04W 4/00* (2009.01)
*H04W 36/00* (2009.01)
*H04W 8/18* (2009.01)
(Continued)

(52) U.S. Cl.
CPC .......... *H04W 36/0038* (2013.01); *H04W 8/186* (2013.01); *H04W 12/08* (2013.01); *H04W 48/02* (2013.01); *H04W 84/045* (2013.01)

(58) Field of Classification Search
None
See application file for complete search history.

(56) References Cited

U.S. PATENT DOCUMENTS

2008/0291874 A1\*  11/2008  Bae et al. ....................... 370/331
2009/0168722 A1\*   7/2009  Saifullah et al. ............... 370/331
(Continued)

FOREIGN PATENT DOCUMENTS

| JP | 2009-130602 A | 6/2009 |
|---|---|---|
| WO | 2008/088168 A1 | 7/2008 |

(Continued)

OTHER PUBLICATIONS

Official Action in the counterpart Canadian Patent application No. 2771633 issued on Nov. 18, 2013 (2 pages).

(Continued)

*Primary Examiner* — Minh-Trang Nguyen
(74) *Attorney, Agent, or Firm* — Osha Liang LLP

(57) ABSTRACT

A mobile communication method according to the present invention includes: a step of a mobile switching center MME managing access information that defines accessible CSG-ID of a mobile station UE; a step of the mobile switching center MME accommodating a combination of eNB-IDs and CSG-IDs of a radio base station HeNB2 from a gateway device HeNB-GW; and a step of the mobile switching center MME determining whether the mobile station UE is accessible to the radio base station HeNB2 based on identification information of the mobile station UE and eNB-ID of the radio base station HeNB2 included in "HO Required" received from the radio base station eNB, which are included in the handover request signal, with reference to the access information and the combination.

4 Claims, 12 Drawing Sheets

(51) Int. Cl.
*H04W 48/02* (2009.01)
*H04W 84/04* (2009.01)
*H04W 12/08* (2009.01)

(56) References Cited

U.S. PATENT DOCUMENTS

2010/0040023 A1* 2/2010 Gallagher et al. ............ 370/331
2010/0330994 A1 12/2010 Matsuo et al.

FOREIGN PATENT DOCUMENTS

WO 2009/022976 A1 2/2009
WO 2009/095970 A1 8/2009

OTHER PUBLICATIONS

International Search Report w/translation from PCT/JP2010/063603 dated Nov. 9, 2010 (4 pages).
3GPP TSG-RAN2 Meeting #68, R3-097517; "Access control for handover procedures to LTE CSG/hybrid cells"; RAN3; Jeju, Korea; Nov. 9-13, 2009 (7 pages).
3GPP TSG-Ran WG2 Meeting #67, R2-094948; "A particular case of HO for HeNB unreliability"; HTC Corporation; Shenzhen, China; Aug. 24-28, 2009 (6 pages).
3GPP TS 36.401 V10.3.0; "3rd Generation Partnership Project; Technical Specification Group Radio Access Network; Evolved Universal Terrestrial Radio Access Network (E-UTRAN); Architecture description (Release 10)"; Sep. 2011 (20 pages).
3GPP TS 36.300 V11.0.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)"; Dec. 2011 (194 pages).
Extended European Search Report in corresponding European Application No. 10809892.2 dated Apr. 4, 2013 (6 pages).
Motorola; "Access Checking for handover to HeNBs"; 3GPP TSG-RAN WG2#65bis, R2-092302; Seoul, Korea; Mar. 23-27, 2009 (2 pages).
Chinese Office Action issued in Chinese Patent Application No. 201080036903.5, mailing date Dec. 10, 2013, with English translation thereof (21 pages).
Office Action issued in Korean Patent Application No. 10-2012-7004648, mailed Aug. 21, 2013, with English translation thereof (6 pages).
Office Action issued in counterpart Chinese Patent Application No. 201080036903.5 mailed on Jun. 18, 2014 (18 pages).
Office Action in corresponding European Patent Application No. 10809892.2 dated May 27, 2015 (5 pages).
Office Action in counterpart Canadian Patent Application No. 2,771,633 mailed Jan. 9, 2015 (3 pages).

* cited by examiner

MOBILE COMMUNICATION METHOD

TECHNICAL FIELD

The present invention relates to a mobile communication method.

BACKGROUND ART

In an E-UTRAN mobile communication system, when a mobile station UE connected to a radio base station HeNB (Home eNodeB) operated in a "Hybrid Access" scheme or a "Closed Access" scheme performs an attach process, a service request process, or a handover process, a mobile switching center MME is configured to perform "Accessibility Check" for checking whether the mobile station UE has an access right to a CSG (Closed Subscriber Group) cell subordinate to the radio base station HeNB.

With reference to FIG. 11, an example of the "Accessibility Check" will be simply described.

As illustrated in FIG. 11, a mobile station UE having visited a cell subordinate to a radio base station eNB transmits "Measurement Report (step S1001A)" including only PCI (Physical Cell ID), or "Measurement Report (step S1001B)" including the PCI and E-CGI (E-UTRA Cell Global ID) to the radio base station eNB.

If the radio base station eNB decides a handover of the mobile station UE based on the received "Measurement Report", the radio base station eNB decides eNB-ID "yyy.001" of a radio base station HeNB2 (a handover destination) based on the PCI (step S1002A) or the E-CGI (step S1002B) which is included in the "Measurement Report", and transmits "HO Required" including the eNB-ID "yyy.001" of the radio base station HeNB2 to a mobile switching center MME in step S1003.

In step S1004, the mobile switching center MME extracts CSG-ID "#31" corresponding to the eNB-ID "yyy.001" of the radio base station HeNB2 included in the received "HO Required" with reference to "eNB-ID←→CSG-ID table", and checks whether the CSG-ID "#31" is included in "UE CSG Subscription info" for the mobile station UE, thereby performing "Accessibility Check" with respect to the mobile station UE.

In addition, the mobile switching center MME is configured to accommodate the "eNB-ID←→CSG-ID table" including a combination (entry) of eNB-ID and CSG-ID of the radio base station HeNB when an S1 connection is established between the mobile switching center MME and each radio base station HeNB.

SUMMARY OF THE INVENTION

Problems to be Solved by the Invention

However, in a conventional E-UTRAN mobile communication system, a gateway device HeNB-GW is configured to be provided between the mobile switching center MME and the radio base station HeNB.

In the case where the gateway device HeNB-GW is provided, as illustrated in FIG. 12, since it is not possible to recognize a combination of eNB-ID and CSG-ID of each radio base station HeNB accommodated in the gateway device HeNB-GW, there is a problem that it is not possible for the mobile switching center MME to perform the above-mentioned "Accessibility Check" with respect to the mobile station UE in step S2004.

Therefore, the present invention has been achieved in view of the above-described problems, and an object thereof is to provide a mobile communication method capable of performing "Accessibility Check" with respect to a mobile station UE even when a gateway device accommodating a plurality of radio base stations is provided.

Means for Solving the Problem

A first characteristic of the present embodiment is summarized in that a mobile communication method includes: a step of a mobile switching center managing access information for defining radio base station group identification information accessible by a mobile station; a step of the mobile switching center accommodating a combination of identification information and radio base station group identification information of a second radio base station from a gateway device accommodating the second radio base station; a step of, when a first radio base station decides a handover of the mobile station from a cell subordinate to the first radio base station to a cell subordinate to the second radio base station, the first radio base station transmitting a handover request signal including the identification information of the mobile station and the identification information of the second radio base station to the mobile switching center; and a step of the mobile switching center determining whether the mobile station is accessible to the second radio base station based on the identification information of the mobile station and the identification information of the second radio base station, which are included in the handover request signal, with reference to the access information and the combination.

A second characteristic of the present embodiment is summarized in that a mobile communication method includes: a step of a mobile switching center managing access information for defining radio base station group identification information accessible by a mobile station; a step of, when a first radio base station decides a handover of the mobile station from a cell subordinate to the first radio base station to a cell subordinate to a second radio base station accommodated in a gateway device, the first radio base station transmitting a handover request signal including identification information of the mobile station and a combination of identification information and radio base station group identification information of the second radio base station to the mobile switching center; and a step of the mobile switching center determining whether the mobile station is accessible to the second radio base station based on the identification information of the mobile station and the radio base station group identification information of the second radio base station, which are included in the handover request signal, with reference to the access information.

A third characteristic of the present embodiment is summarized in that a mobile communication method includes: a step of a mobile switching center managing access information for defining radio base station group identification information accessible by a mobile station; a step of, when a first radio base station decides a handover of the mobile station from a cell subordinate to the first radio base station to a cell subordinate to a second radio base station accommodated in a gateway device, the first radio base station transmitting a handover request signal including identification information of the mobile station and identification information of the second radio base station to the mobile switching center; a step of the mobile switching center transmitting a handover request signal to the second radio base station via the gateway device; a step of the second radio base station notifying the mobile switching center of radio base station group identification information of the second radio base station via the gateway device in response to the handover request signal; and a step of the mobile switching center determining whether the mobile station is accessible to the second radio base station based on the identification information of the mobile station and the notified radio base station group identification information of the second radio base station, which are included in the handover request signal, with reference to the access information.

A fourth characteristic of the present embodiment is summarized in that a mobile communication method includes: a step of a mobile switching center notifying the first radio base station of access information for defining radio base station group identification information accessible by a mobile station; and a step of, when a first radio base station decides a handover of the mobile station from a cell subordinate to the first radio base station to a cell subordinate to a second radio base station accommodated in a gateway device, the first radio base station determining whether the mobile station is accessible to the second radio base station with reference to the access information.

A fifth characteristic of the present embodiment is summarized in that a mobile communication method includes: a step of, when a first radio base station decides a handover of a mobile station from a cell subordinate to the first radio base station to a cell subordinate to a second radio base station accommodated in a gateway device, the first radio base station transmitting a handover request signal including identification information of the mobile station to the mobile switching center; a step of the mobile switching center transmitting a handover request signal, which includes access information for defining accessible radio base station group identification information of the mobile station and the identification information of the mobile station, to the second radio base station via the gateway device; and a step of the second radio base station determining whether the mobile station is accessible to the second radio base station based on the identification information of the mobile station and the managed radio base station group identification information of the second radio base station, which are included in the handover request signal, with reference to the access information included in the handover request signal.

A sixth characteristic of the present embodiment is summarized in that a mobile communication method includes: a step of a gateway device accommodating a combination of identification information and radio base station group identification information of a second radio base station from the second radio base station accommodated in the gateway device, and accommodating access information for defining radio base station group identification information accessible by a mobile station from the mobile switching center; a step of, when the first radio base station decides a handover of the mobile station from a cell subordinate to the first radio base station to a cell subordinate to the second radio base station, the first radio base station transmitting a handover request signal including identification information of the mobile station and identification information of the second radio base station to the mobile switching center; a step of the mobile switching center transmitting the handover request signal including the identification information of the mobile station and the identification information of the second radio base station to the gateway device; and a step of the gateway device determining whether the mobile station is accessible to the second radio base station based on the identification information of the mobile station and the identification information of the second radio base station, which are included in the handover request signal, with reference to the access information and the combination.

A seventh characteristic of the present embodiment is summarized in that a mobile communication method includes: a step of, when a first radio base station decides a handover of a mobile station from a cell subordinate to the first radio base station to a cell subordinate to a second radio base station accommodated in the gateway device, the first radio base station deciding whether to determine whether the mobile station is accessible to the second radio base station based on an access mode of the second radio base station.

Effect of the Invention

As described above, according to the present invention, it is possible to provide a mobile communication method capable of performing "Accessibility Check" with respect to a mobile station UE even when a gateway device accommodating a plurality of radio base stations is provided.

BEST MODES FOR CARRYING OUT THE INVENTION (Mobile Communication System According to First Embodiment of the Present Invention)

Figure 1:
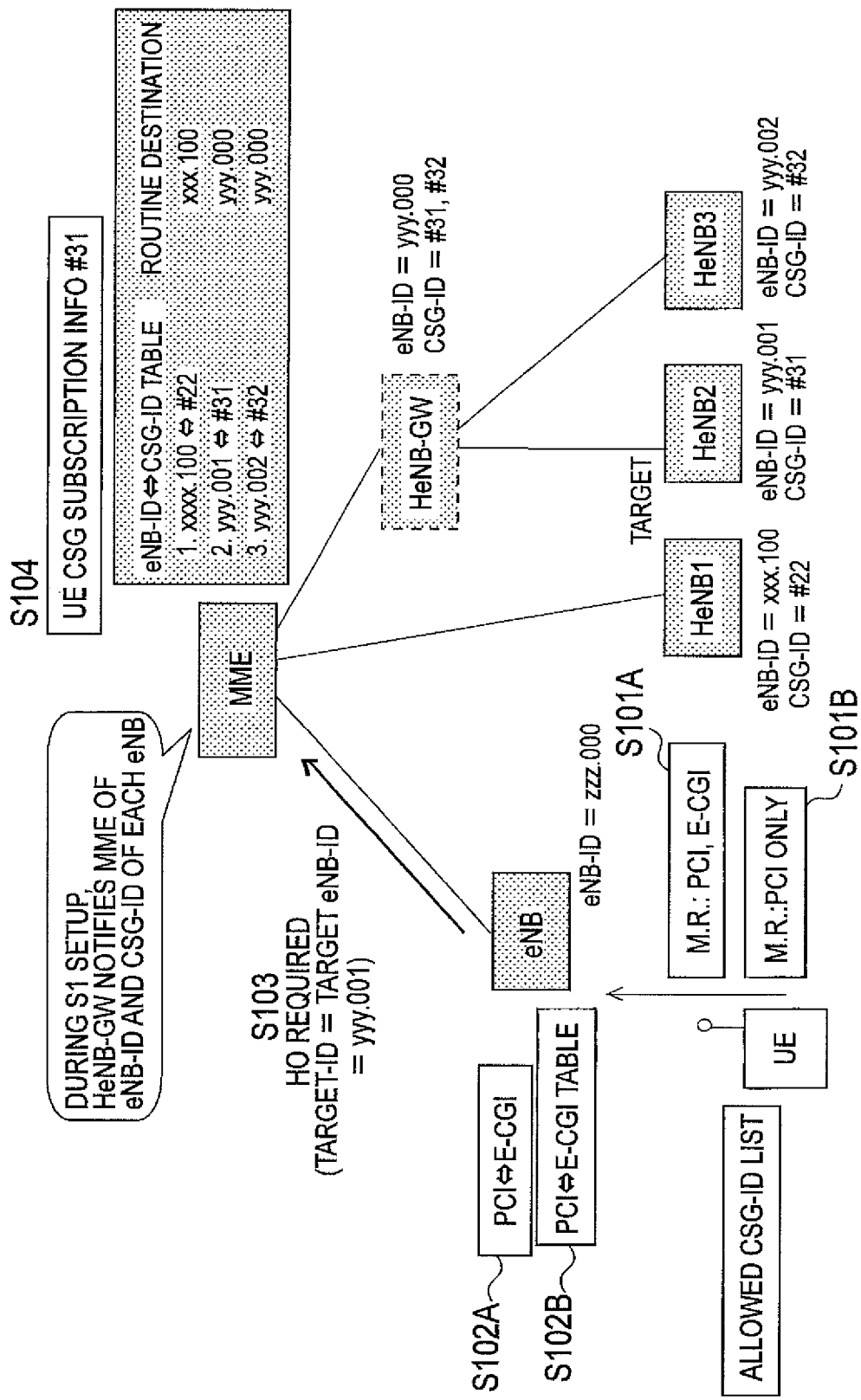
FIG. 1 is a diagram explaining an operation of a mobile communication system according to a first embodiment of the present invention.
Figure 2:
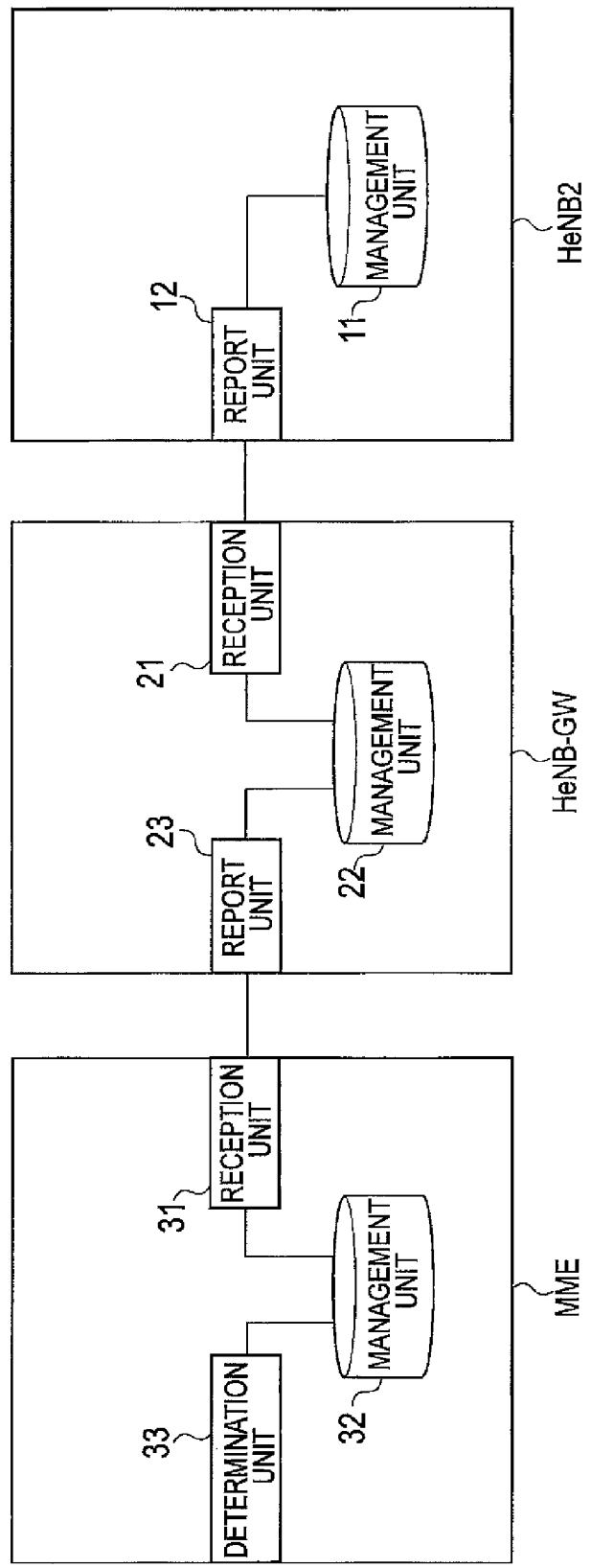
FIG. 2 is a functional block diagram of the mobile communication system according to the first embodiment of the present invention.

With reference to FIG. 1 and FIG. 2, a mobile communication system according to a first embodiment of the present invention will be described.

The mobile communication system according to the present embodiment is a mobile communication system of the E-UTRAN scheme and is provided with a mobile switching center MME, a gateway device HeNB-GW, a radio base station eNB, and a radio base station HeNB, as illustrated in FIG. 1.

With reference to FIG. 1, in the mobile communication system according to the present embodiment, when a mobile station UE is handed over from a cell subordinate to the radio base station eNB to a cell subordinate to a radio base station HeNB2, an operation for performing "Accessibility Check" with respect to the mobile station UE will be described.

In addition, in the mobile communication system according to the present embodiment, a signal (Handover Signaling) associated with a handover is configured to be terminated at the mobile switching center MME.

As illustrated in FIG. 1, the mobile station UE having visited the cell subordinate to the radio base station eNB transmits "Measurement Report (step S101A)" including only PCI, or "Measurement Report (step S101B)" including PCI and E-CGI to the radio base station eNB.

If the radio base station eNB decides a handover of the mobile station UE from the cell subordinate to the radio base station eNB to the cell subordinate to the radio base station HeNB2 based on the received "Measurement Report", the radio base station eNB decides eNB-ID "yyy.001" of the radio base station HeNB2 (a handover destination) based on the PCI (step S102A) or the E-CGI (step S102B) which is included in the "Measurement Report", and transmits "HO Required" including identification information of the mobile station UE and the eNB-ID "yyy.001" of the radio base station HeNB2 to the mobile switching center MME in step S103.

Here, in the mobile communication system according to the present embodiment, the identification information of the mobile station UE may be "TMSI: Temporary Mobile Subscriber Identity", "eNB UE S1AP ID", or "MME UE S1AP ID".

In step S104, the mobile switching center MME extracts CSG-ID "#31" corresponding to the eNB-ID "yyy.001" of the radio base station HeNB2 included in the received "HO Required" with reference to "eNB-ID←→CSG-ID table" including a combination (entry) of eNB-ID and CSG-ID of the radio base station HeNB2, and checks whether the CSG-ID "#31" is included in "UE CSG Subscription info" for the mobile station UE specified by the identification information of the mobile station UE included in the received "HO Required", thereby performing "Accessibility Check" with respect to the mobile station UE In addition, the mobile switching center MME is configured to accommodate the "eNB-ID←→CSG-ID table" including the combination of the eNB-ID and the CSG-ID of the radio base station HeNB2 when an S1 connection is established between the mobile switching center MME and the gateway device HeNB-GW accommodating the radio base station HeNB2.

As illustrated in FIG. 2, in the mobile communication system according to the present embodiment, the radio base station HeNB2 includes a management unit 11 and a report unit 12, the gateway device HeNB-GW includes a reception unit 21, a management unit 22, and a report unit 23, and the mobile switching center MME includes a reception unit 31, a management unit 32, and a determination unit 33.

The management unit 11 of the radio base station HeNB2 is configured to manage the eNB-ID "yyy.001" and the CSG-ID "#31" of the radio base station HeNB2.

The report unit 12 of the radio base station HeNB2 is configured to report the eNB-ID "yyy.001" and the CSG-ID "#31" of the radio base station HeNB2 to the gateway device HeNB-GW at a predetermined timing, for example, when an S1 connection is established between the gateway device HeNB-GW and the radio base station HeNB2.

The reception unit 21 of the gateway device HeNB-GW is configured to receive eNB-IDs and CSG-IDs of the radio base stations HeNB2 and HeNB3, which have been reported by the accommodated radio base stations HeNB2 and HeNB3.

The management unit 22 of the gateway device HeNB-GW is configured to manage the eNB-IDs and the CSG-IDs of the radio base stations HeNB2 and HeNB3, which have been received in the reception unit 21.

The report unit 23 of the gateway device HeNB-GW is configured to report the eNB-IDs and the CSG-IDs of the accommodated radio base stations HeNB2 and HeNB3 at a predetermined timing, for example, when an S1 connection is established between the gateway device HeNB-GW and the mobile switching center MME.

The reception unit 31 of the mobile switching center MME is configured to receive the eNB-IDs and the CSG-IDs of the radio base stations HeNB2 and HeNB3, which have been reported by the gateway device HeNB-GW.

The management unit 32 of the mobile switching center MME is configured to manage "eNB-ID←→CSG-ID table" including the eNB-IDs and the CSG-TDs of the radio base stations HeNB1 to HeNB3, which have been received in the reception unit 31.

Furthermore, the management unit 32 of the mobile switching center MME is configured to manage "UE CSG Subscription info" for each mobile station UE. Here, the "UE CSG Subscription info" indicates access information for defining CSG-ID (radio base station group identification information), time and the like accessible by the mobile station UE.

The determination unit 33 of the mobile switching center MME is configured to determine whether the mobile station UE is accessible to the radio base station HeNB2 based on the identification information of the mobile station UE and the eNB-ID of the radio base station HeNB2, which are included in the "HO Required" transmitted by the radio base station eNB, with reference to the "UE CSG Subscription info" for the mobile station UE and the "eNB-ID←→CSG-ID table", thereby performing the "Accessibility Check" with respect to the mobile station UE.

In accordance with the mobile communication system according to the first embodiment of the present invention, it is possible for the mobile switching center MME to perform the "Accessibility Check" with respect to the mobile station UE by using the combination of the eNB-ID and the CSG-ID of the radio base station HeNB2, which has been reported from the gateway device HeNB-GW, even when the mobile station UE is handed over to the cell subordinate to the radio base station HeNB2 accommodated in the gateway device HeNB-GW.

(First Modification)

Figure 3:
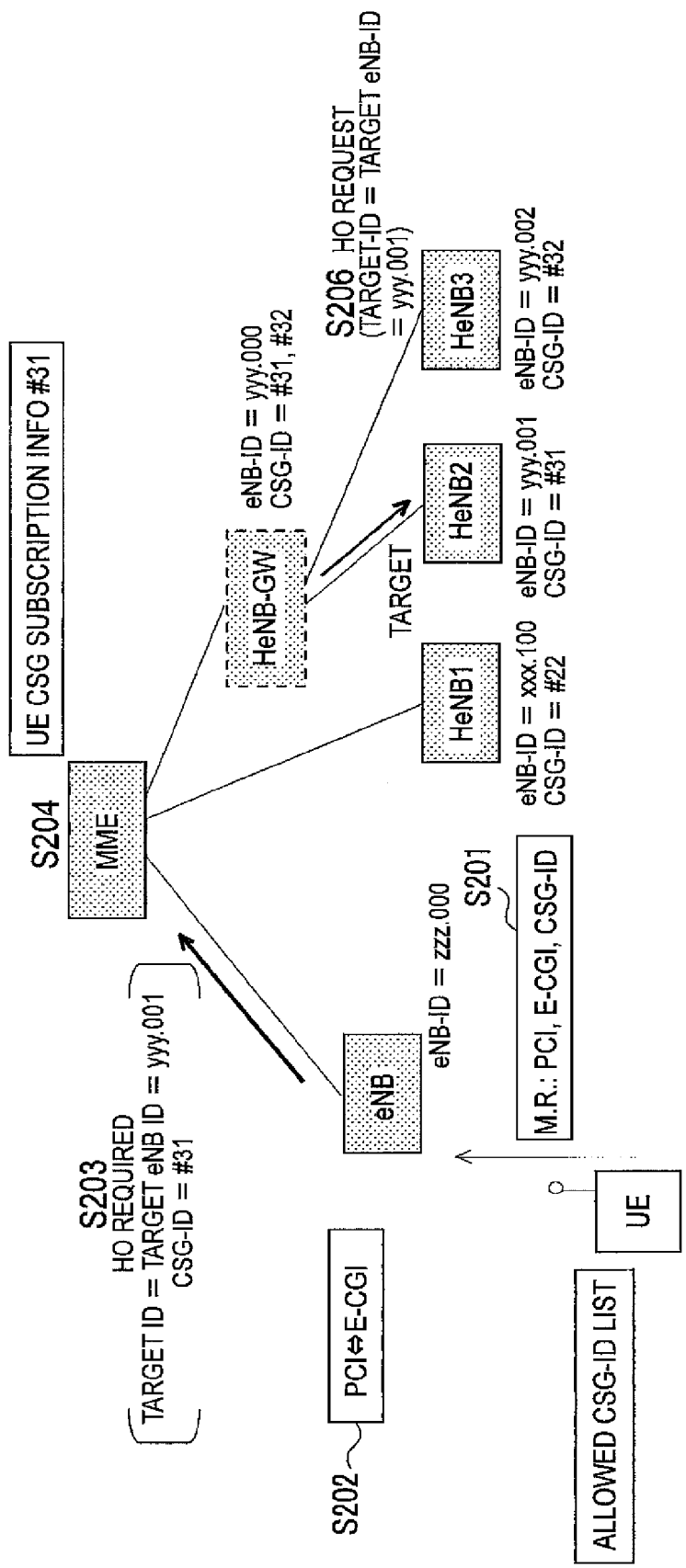
FIG. 3 is a diagram explaining an operation of a mobile communication system according to a first modification of the present invention.

With reference to FIG. 3, a mobile communication system according to a first modification of the present invention will be described. The following is a description of the mobile communication system according to the first modification, focusing on the points of difference from the mobile communication system according to the first embodiment described above.

Hereinafter, with reference to FIG. 3, in the mobile communication system according to the first modification, when the mobile station UE is handed over from a cell subordinate to the radio base station eNB to a cell subordinate to the radio base station HeNB2, an operation for performing "Accessibility Check" with respect to the mobile station UE will be described.

As illustrated in FIG. 3, in step S201, the mobile station UE having visited the cell subordinate to the radio base station eNB transmits "Measurement Report" including PCI, E-CGI, and CSG-ID to the radio base station eNB.

If the radio base station eNB decides a handover of the mobile station UE from the cell subordinate to the radio base station eNB to the cell subordinate to the radio base station HeNB2 based on the received "Measurement Report", the radio base station eNB decides eNB-ID "yyy.001" of the radio base station HeNB2 (a handover destination) based on the E-CGI which is included in the "Measurement Report", and transmits "HO Required" to the mobile switching center MME in step S203, wherein the "HO Required" includes identification information of the mobile station UE and a combination of and the eNB-ID "yyy.001" and CSG-ID "#31" of the radio base station HeNB2.

In step S204, the mobile switching center MME checks whether the CSG-ID "#31" of the radio base station HeNB2, which is included in the received "HO Required", is included in "UE CSG Subscription info" for the mobile station UE specified by the identification information of the mobile station UE included in the received "HO Required", thereby performing "Accessibility Check" with respect to the mobile station UE specified by the identification information of the mobile station UE included in the received "HO Required".

In the mobile communication system according to the first modification, it is assumed that it is possible to trust the mobile station UE, and the PCI, the E-CGI, and the CSG-ID transmitted by the mobile station UE are correct information.

In the mobile communication system according to the first modification, the determination unit 33 of the mobile switching center MME illustrated in FIG. 2 is configured to determine whether the mobile station UE is accessible to the radio base station HeNB based on the identification information of the mobile station UE and the CSG-ID of the radio base station HeNB2, which are included in the "HO Required" transmitted by the radio base station eNB, with reference to the "UE CSG Subscription info" for the mobile station UE, thereby performing the "Accessibility Check" with respect to the mobile station UE.

In addition, in the mobile communication system according to the first modification, it is not necessary for the reception unit 31 of the mobile switching center MME to accommodate the combination of the eNB-ID and the CSG-ID of the radio base station HeNB2 from the gateway device HeNB-GW.

In accordance with the mobile communication system according to the first modification, it is possible for the mobile switching center MME to perform the "Accessibility Check" by using the CSG-ID of the radio base station HeNB2, which has been reported by the mobile station UE, even when the gateway device HeNB-GW has been provided.

(Second Modification)

Figure 4:
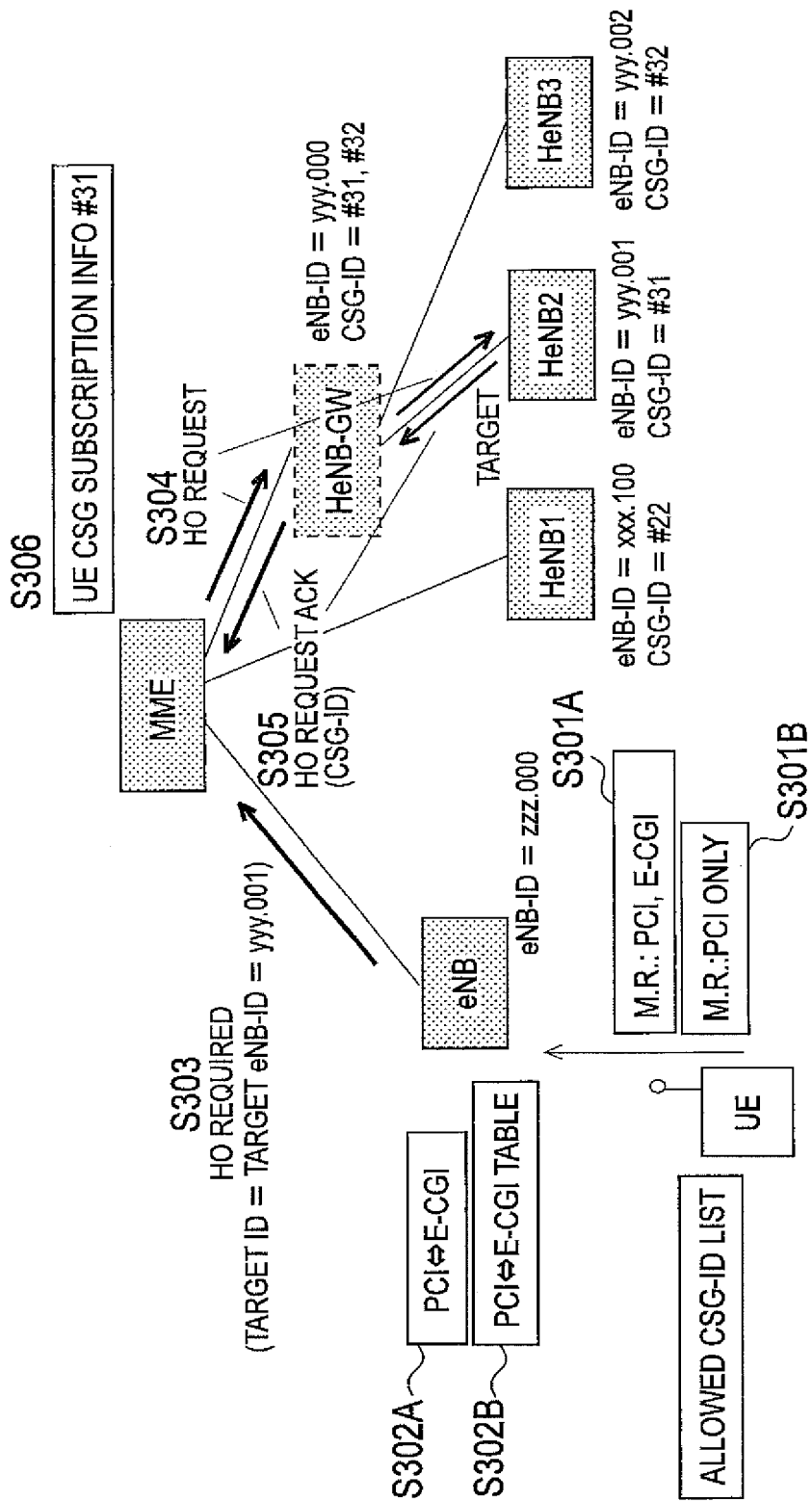
FIG. 4 is a diagram explaining an operation of a mobile communication system according to a second modification of the present invention.

With reference to FIG. 4, a mobile communication system according to a second modification of the present invention will be described. The following is a description of the mobile communication system according to the second modification, focusing on the points of difference from the mobile communication system according to the first embodiment described above.

Hereinafter, with reference to FIG. 4, in the mobile communication system according to the second modification, when the mobile station UE is handed over from a cell subordinate to the radio base station eNB to a cell subordinate to the radio base station HeNB2, an operation for performing "Accessibility Check" with respect to the mobile station UE will be described.

As illustrated in FIG. 4, the mobile station UE having visited the cell subordinate to the radio base station eNB transmits "Measurement Report (step S301A)" including only PCI, or "Measurement Report (step S301B)" including PCI and E-CGT to the radio base station eNB.

If the radio base station eNB decides a handover of the mobile station UE from the cell subordinate to the radio base station eNB to the cell subordinate to the radio base station HeNB2 based on the received "Measurement Report", the radio base station eNB decides eNB-ID "yyy.001" of the radio base station HeNB2 (a handover destination) based on the PCI (step S302A) or the E-CGI (step S302B) which is included in the "Measurement Report", and transmits "HO Required" including identification information of the mobile station UE and the eNB-ID "yyy.001" of the radio base station HeNB2 to the mobile switching center MME in step S303.

In step S304, the mobile switching center MME transmits "HO Request" to the radio base station HeNB2 via the gateway device HeNB-GW.

In step S305, the radio base station HeNB2 transmits "HO Request ACK" including CSG-ID "#31" of the radio base station HeNB2 to the mobile switching center MME via the gateway device HeNB-GW in response to the "HO Request".

In step S306, the mobile switching center MME checks whether the CSG-ID "#31" included in the "HO Request ACK" is included in "UE CSG Subscription info" for the mobile station UE specified by the identification information of the mobile station UE included in the received "HO Required", thereby performing "Accessibility Check" with respect to the mobile station UE.

In the mobile communication system according to the second modification, the determination unit 33 of the mobile switching center MME illustrated in FIG. 2 is configured to determine whether the mobile station UE is accessible to the radio base station HeNB based on the identification information of the mobile station UE, which is included in the "HO Required" transmitted by the radio base station eNB, and the CSG-ID of the radio base station HeNB2, which is included in the "HO Request ACK" transmitted by the radio base station HeNB2, with reference to the "UE CSG Subscription info" for the mobile station UE, thereby performing the "Accessibility Check" with respect to the mobile station UE.

In addition, in the mobile communication system according to the second modification, it is not necessary for the reception unit 31 of the mobile switching center MME to accommodate the combination of the eNB-ID and the CSG-ID of the radio base station HeNB2 from the gateway device HeNB-GW.

In accordance with the mobile communication system according to the second modification, it is possible for the mobile switching center MME to perform the "Accessibility Check" by using the CSG-ID of the radio base station HeNB2, which has been reported by the radio base station HeNB2, even when the gateway device HeNB-GW has been provided.

(Third Modification)

Figure 5:
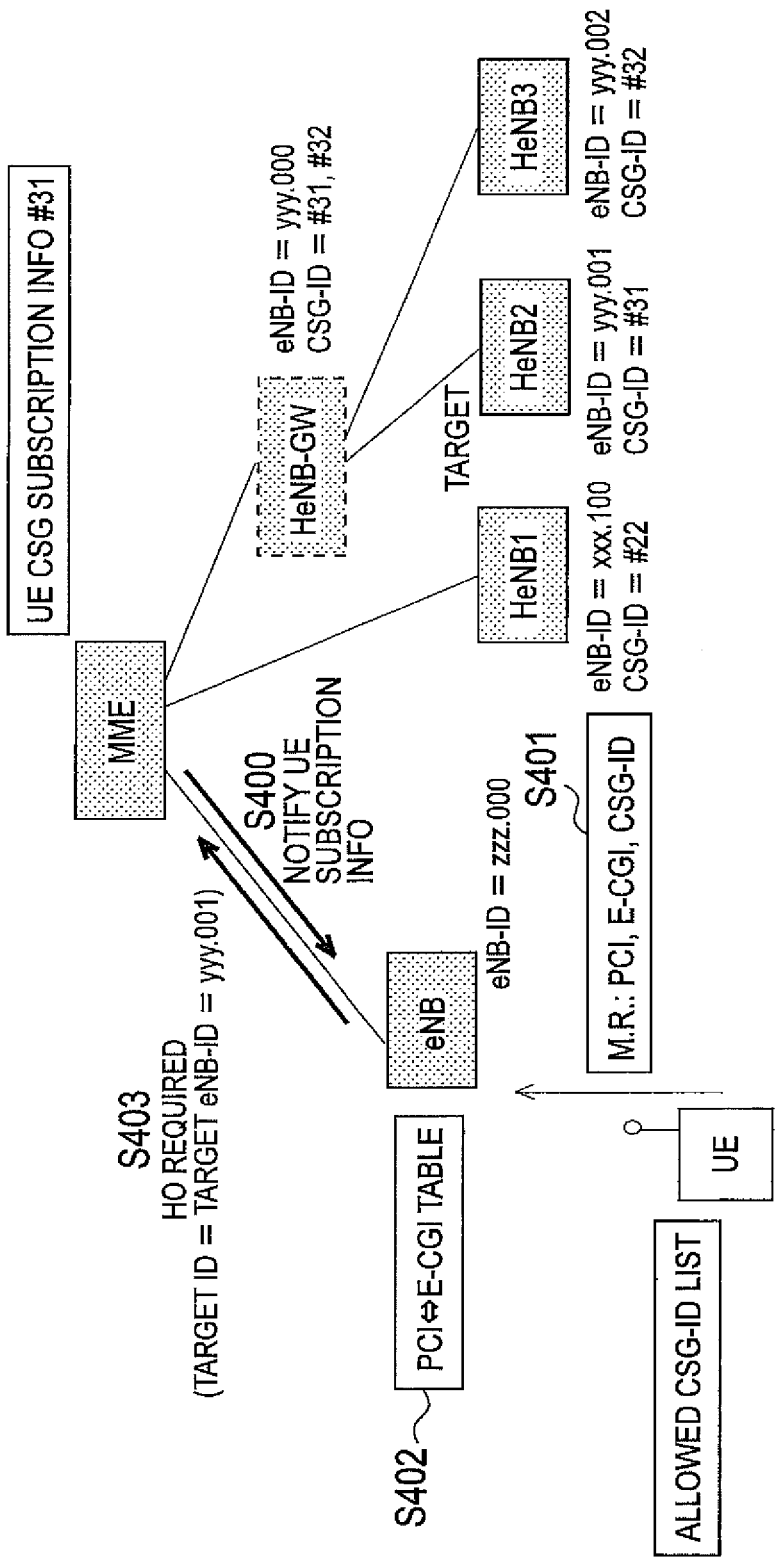
FIG. 5 is a diagram explaining an operation of a mobile communication system according to a third modification of the present invention.
Figure 6:
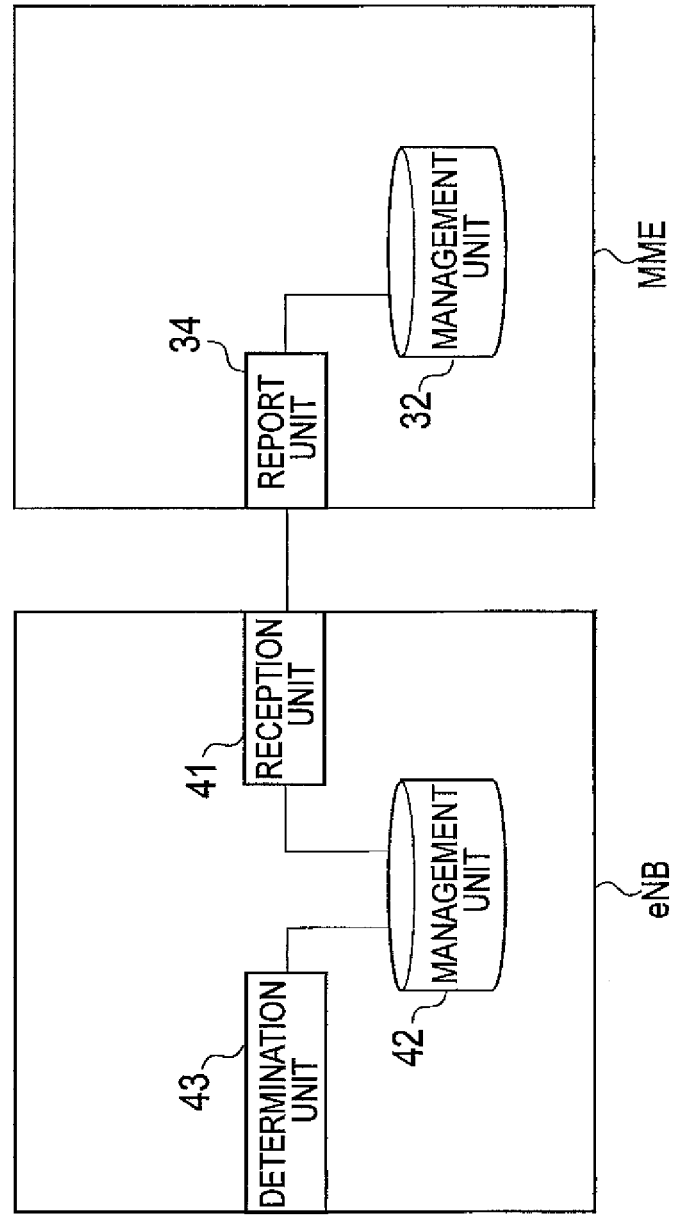
FIG. 6 is a functional block diagram of the mobile communication system according to the third modification of the present invention.

With reference to FIG. 5 and FIG. 6, a mobile communication system according to a third modification of the present invention will be described. The following is a description of the mobile communication system according to the third modification, focusing on the points of difference from the mobile communication system according to the first embodiment described above.

Hereinafter, with reference to FIG. 5, in the mobile communication system according to the third modification, when the mobile station UE is handed over from a cell subordinate to the radio base station eNB to a cell subordinate to the radio base station HeNB2, an operation for performing "Accessibility Check" with respect to the mobile station UE will be described.

As illustrated in FIG. 5, in step S400, the mobile switching center MME reports "UE CSG Subscription info" for the mobile station UE to the radio base station eNB.

In step S401, the mobile station UE having visited the cell subordinate to the radio base station eNB transmits "Measurement Report" including PCI, E-CGI, and CSG-ID to the radio base station eNB.

If the radio base station eNB decides a handover of the mobile station UE from the cell subordinate to the radio base station eNB to the cell subordinate to the radio base station HeNB2 based on the received "Measurement Report", the radio base station eNB checks whether the CSG-ID included in the "Measurement Report" is included in the "UE CSG Subscription info" for the mobile station UE, thereby performing "Accessibility Check" with respect to the mobile station UE.

When the "Accessibility Check" is "OK", the radio base station eNB decides eNB-ID "yyy.001" of the radio base station HeNB2 (a handover destination) based on the E-CGI included in the received "Measurement Report", and transmits "HO Required" including identification information of the mobile station UE and the eNB-ID "yyy.001" of the radio base station HeNB2 to the mobile switching center MME.

In the mobile communication system according to the third modification, it is assumed that it is possible to trust the mobile station UE, and the PCI, the E-CGI, and the CSG-ID transmitted by the mobile station UE are correct information.

As illustrated in Fig. 6, in the mobile communication system according to the third modification, the mobile switching center MME includes the management unit 32 and a report unit 34, and the radio base station eNB includes a reception unit 41, a management unit 42, and a determination unit 43.

The management unit 32 of the mobile switching center MME is configured to manage the "UE CSG Subscription info" for each mobile station UE.

The report unit 33 of the mobile switching center MME is configured to report the "UE CSG Subscription info" for the mobile station UE to the radio base station eNB at a predetermined timing, for example, in "Initial Context Setup procedure", "E-RAB Setup procedure", "E-RAB Modify procedure", "UE Context Modification procedure" and the like.

The reception unit 41 of the radio base station eNB is configured to receive the "UE CSG Subscription info" for the mobile station UE, which has been reported by the mobile switching center MME.

The management unit 42 of the radio base station eNB is configured to manage the "UE CSG Subscription info" for the mobile station UE, which has been received in the reception unit 41.

When the radio base station eNB decides a handover of the mobile station UE from the cell subordinate to the radio base station eNB to the cell subordinate to the radio base station HeNB2, the determination unit 43 of the radio base station eNB is configured to determine whether the mobile station UE is accessible to the radio base station HeNB2 with reference to the "UE CSG Subscription info" for the mobile station UE, thereby performing "Accessibility Check" with respect to the mobile station UE.

In the mobile communication system according to the third modification, it is possible for the radio base station eNB to perform the "Accessibility Check" with respect to the mobile station UE by using the CSG-ID of the radio base station HeNB2, which has been reported by the mobile station UE, and the "UE CSG Subscription info" for the mobile station UE, which has been reported by the mobile switching center MME, even when the gateway device HeNB-GW has been provided.

(Fourth Modification)

Figure 7:
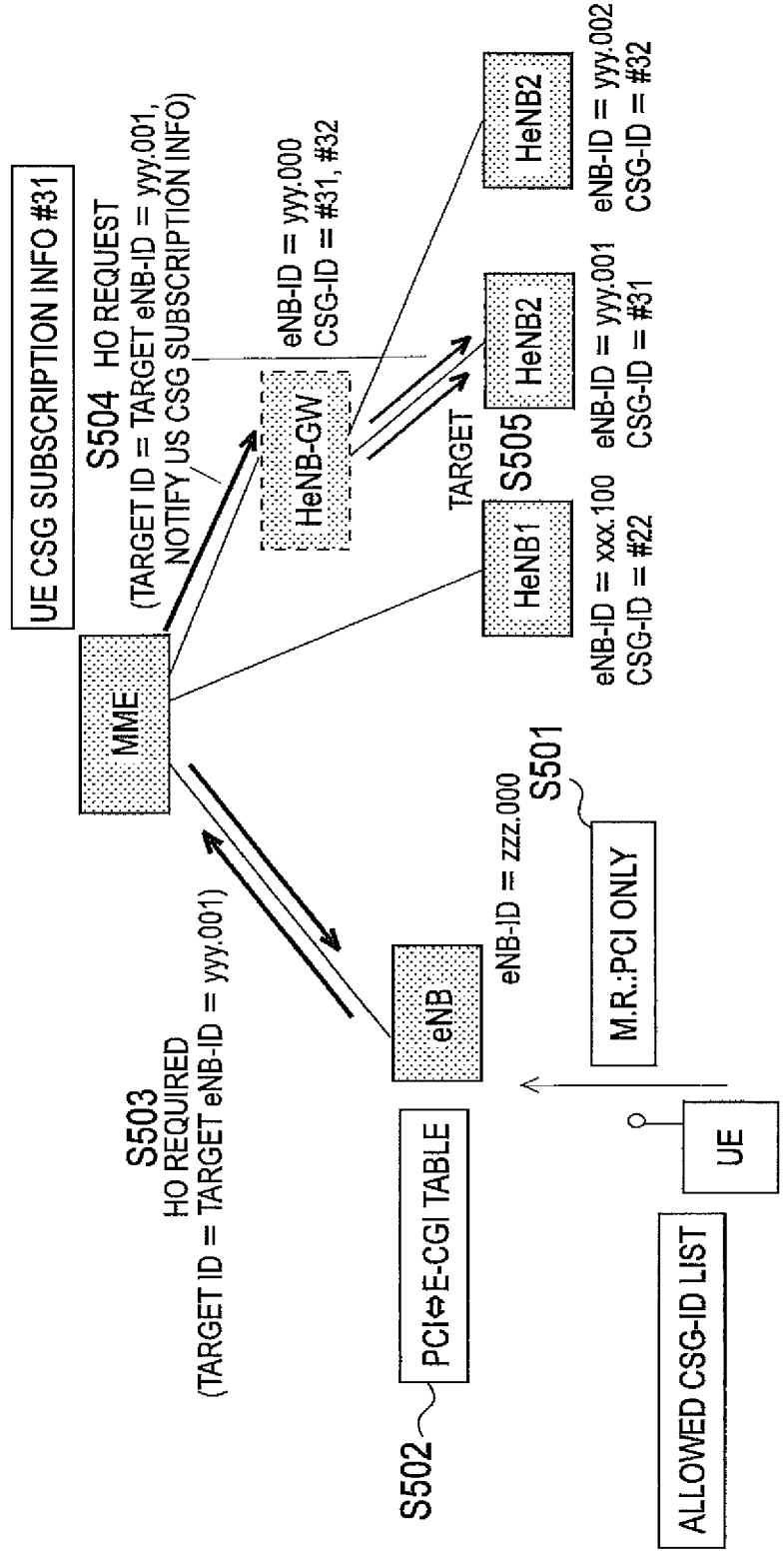
FIG. 7 is a diagram explaining an operation of a mobile communication system according to a fourth modification of the present invention.
Figure 8:
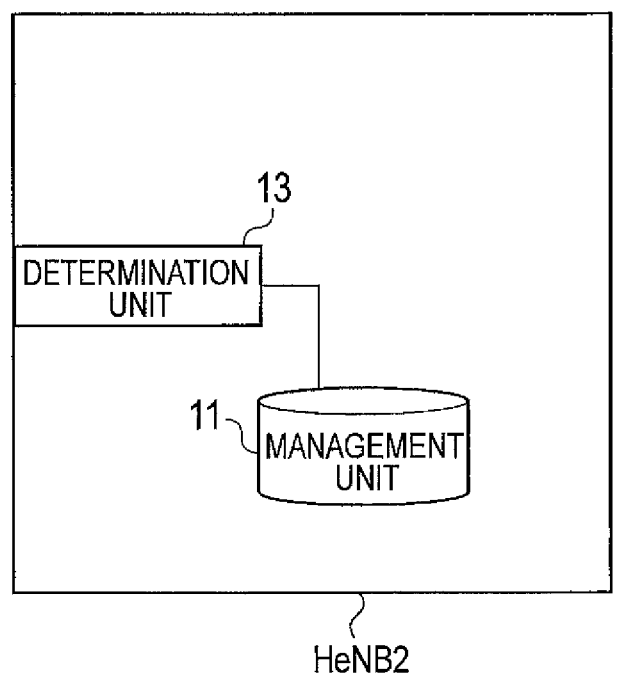
FIG. 8 is a functional block diagram of the mobile communication system according to the fourth modification of the present invention.

With reference to FIG. 7 and FIG. 8, a mobile communication system according to a fourth modification of the present invention will be described. The following is a description of the mobile communication system according to the fourth modification, focusing on the points of difference from the mobile communication system according to the first embodiment described above.

Hereinafter, with reference to FIG. 7, in the mobile communication system according to the fourth modification, when the mobile station UE is handed over from a cell subordinate to the radio base station eNB to a cell subordinate to the radio base station HeNB2, an operation for performing "Accessibility Check" with respect to the mobile station UE will be described.

As illustrated in FIG. 7, the mobile station UE having visited the cell subordinate to the radio base station eNB transmits "Measurement Report (step S501)" including only PCI, or "Measurement Report" including PCI and E-CGI to the radio base station eNB.

If the radio base station eNB decides a handover of the mobile station UE from the cell subordinate to the radio base station eNB to the cell subordinate to the radio base station HeNB2 based on the received "Measurement Report", the radio base station eNB decides eNB-ID "yyy.001" of the radio base station HeNB2 (a handover destination) based on the PCI (step S502) or the E-CGI which is included in the "Measurement Report", and transmits "HO Required" including identification information of the mobile station UE and the eNB-ID "yyy.001" of the radio base station HeNB2 to the mobile switching center MME in step S503.

In step S504, the mobile switching center MME transmits "HO Request" to the radio base station HeNB2 via the gateway device HeNB-GW, wherein the "HO Request" includes "UE CSG Subscription info" for the mobile station UE and identification information of the mobile station UE.

In step S505, the radio base station HeNB2 checks whether managed CSG-ID "#31" of the radio base station HeNB2 is included in the "UE CSG Subscription info" for the mobile station UE specified by the identification information of the mobile station UE included in the received "HO Request", thereby performing "Accessibility Check" with respect to the mobile station UE.

As illustrated in FIG. 8, in the mobile communication system according to the fourth modification, the radio base station HeNB2 includes the management unit 11 and a determination unit 13.

The determination unit 13 of the radio base station HeNB2 is configured to determine whether the mobile station UE is accessible to the radio base station HeNB2 based on the identification information of the mobile station UE, which is included in the "HO Request" received from the mobile switching center MME via the gateway device HeNB-GW, and the CSG-ID of the radio base station HeNB2, which is managed by the management unit 11, with reference to the "UE CSG Subscription info" for the mobile station UE, which is included in the "HO Request", thereby performing the "Accessibility Check" with respect to the mobile station UE.

In accordance with the mobile communication system according to the fourth modification, it is possible for the radio base station HeNB2 to perform the "Accessibility Check" with respect to the mobile station UE by using the "UE CSG Subscription info" for the mobile station UE, which has been reported by the mobile switching center MME, even when the gateway device HeNB-GW has been provided.

(Fifth Modification)

Figure 9:
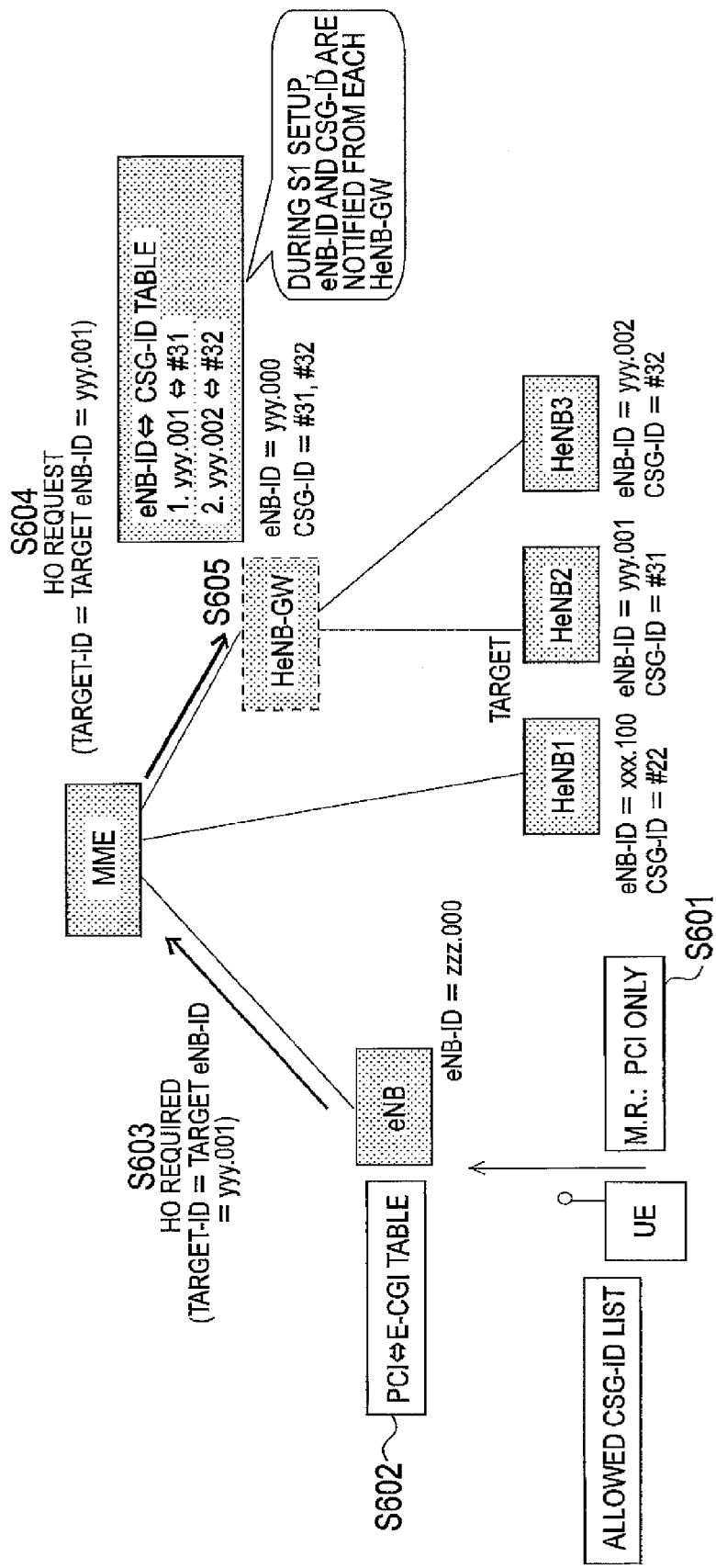
FIG. 9 is a diagram explaining an operation of a mobile communication system according to a fifth modification of the present invention.
Figure 10:
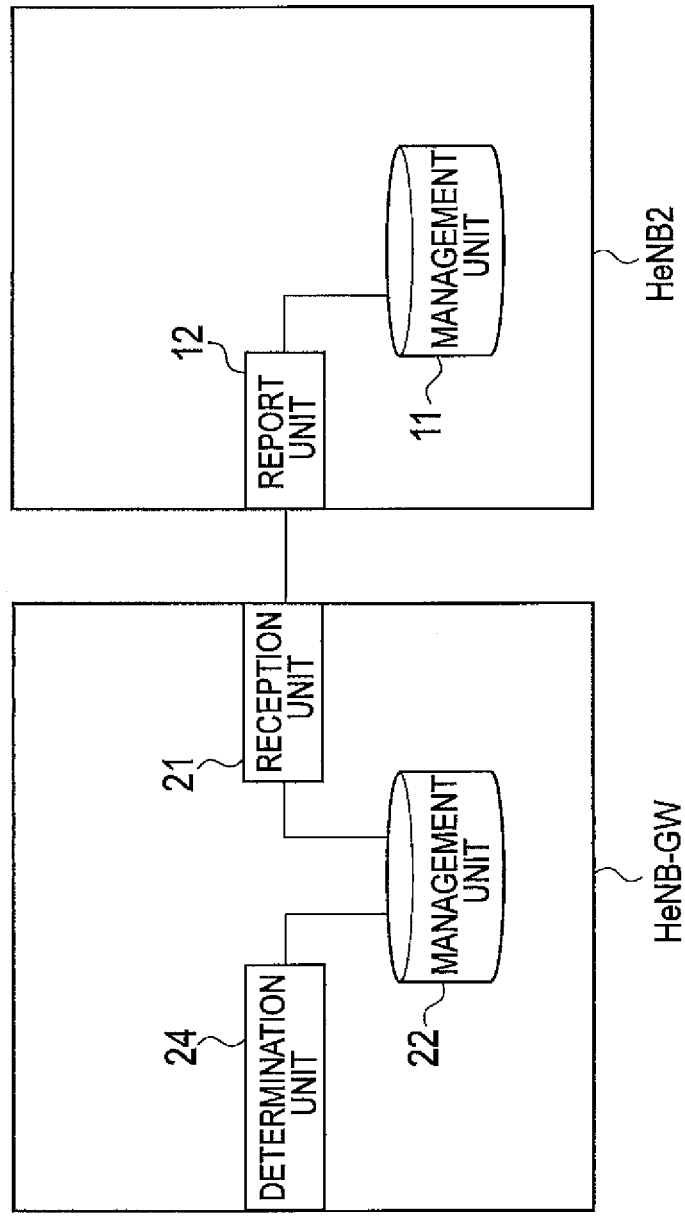
FIG. 10 is a functional block diagram of the mobile communication system according to the fifth modification of the present invention.
Figure 11:
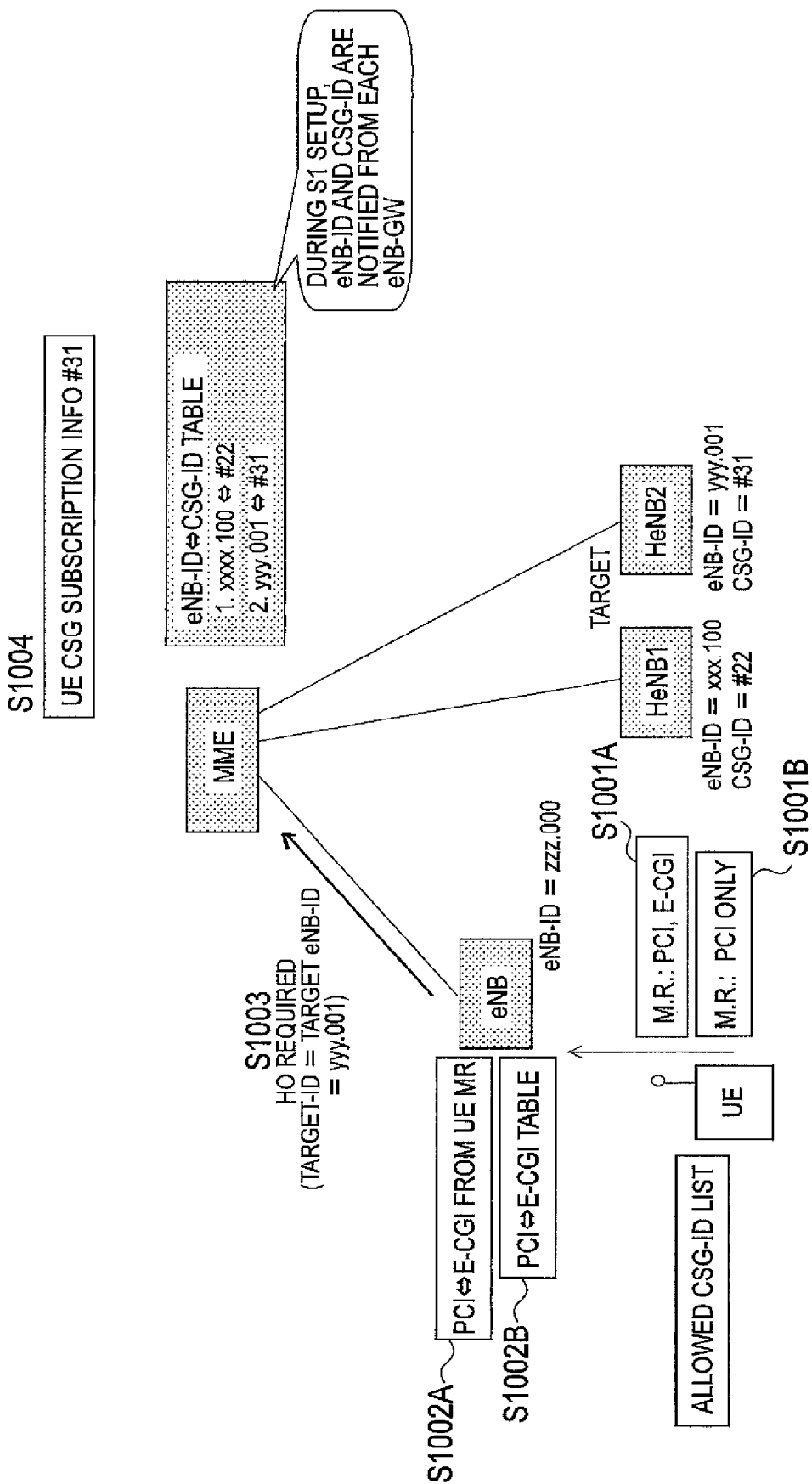
FIG. 11 is a diagram explaining an operation of a conventional mobile communication system.
Figure 12:
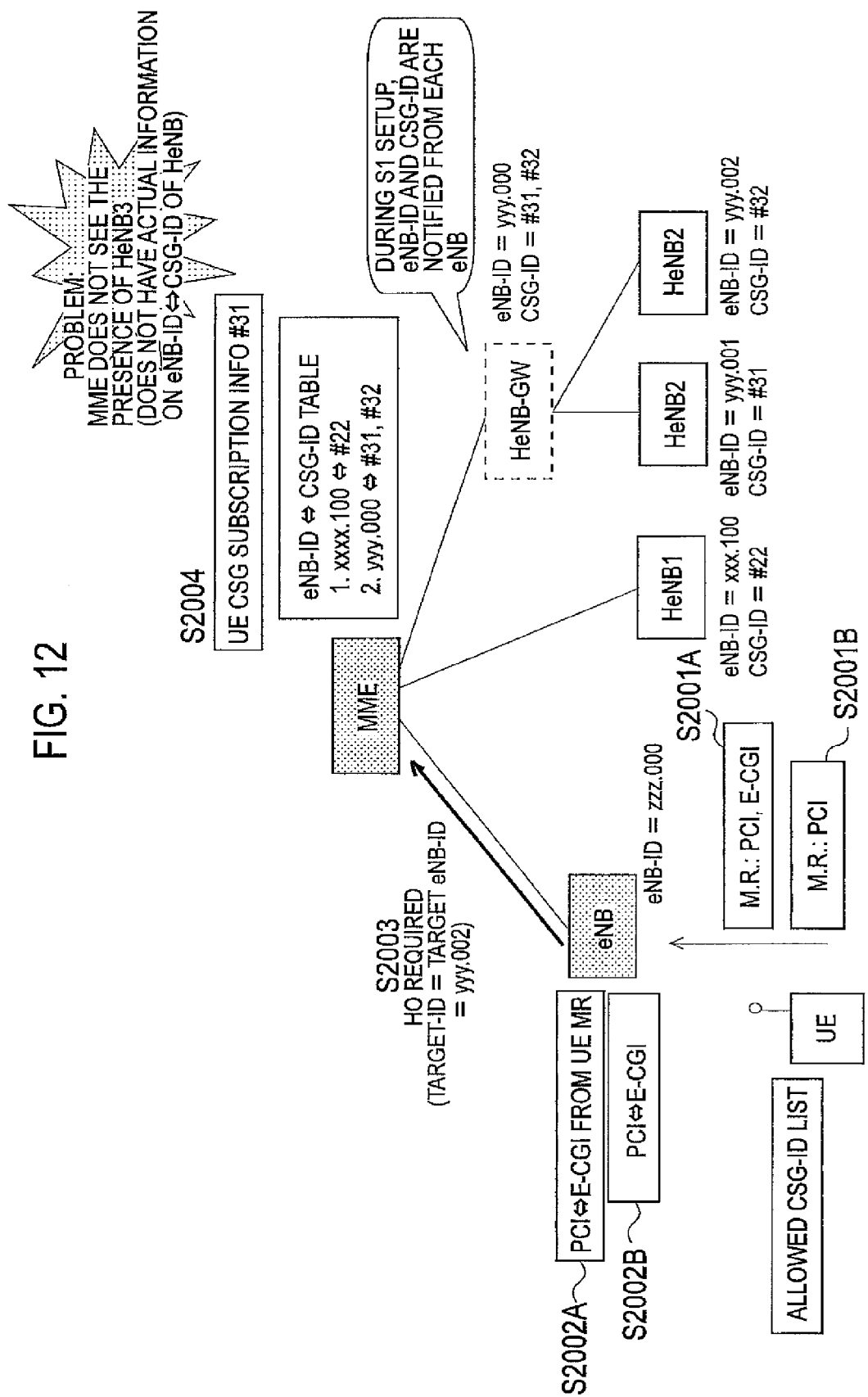
FIG. 12 is diagram explaining a problem of an operation of a conventional mobile communication system.

With reference to FIG. 9 and FIG. 10, a mobile communication system according to a fifth modification of the present invention will be described. The following is a description of the mobile communication system according to the fifth modification, focusing on the points of difference from the mobile communication system according to the first embodiment described above.

Hereinafter, with reference to FIG. 9, in the mobile communication system according to the fifth modification, when the mobile station UE is handed over from a cell subordinate to the radio base station eNB to a cell subordinate to the radio base station HeNB2, an operation for performing "Accessibility Check" with respect to the mobile station UE will be described.

As illustrated in FIG. 9, the mobile station UE having visited the cell subordinate to the radio base station eNB transmits "Measurement Report (step S601)" including only PCI, or "Measurement Report" including PCI and E-CGI to the radio base station eNB.

If the radio base station eNB decides a handover of the mobile station UE from the cell subordinate to the radio base station eNB to the cell subordinate to the radio base station HeNB2 based on the received "Measurement Report", the radio base station eNB decides eNB-ID "yyy.001" of the radio base station HeNB2 (a handover destination) based on the PCI (step S602) or the E-CGI which is included in the "Measurement Report", and transmits "HO Required" including identification information of the mobile station UE and the eNB-ID "yyy.001" of the radio base station HeNB2 to the mobile switching center MME in step S603.

In step S604, the mobile switching center MME transmits "HO Request" including eNB-ID of the radio base station HeNB2 to the gateway device HeNB-GW.

In step S605, the gateway device HeNB-GW extracts CSG-ID "#31" of the radio base station HeNB2 corresponding to the eNB-ID "yyy.001" of the radio base station HeNB2, which is included in the "HO Request", with reference to "eNB-ID←→CSG-ID table", and checks whether the CSG-ID "#31" of the radio base station HeNB2 is included in "UE CSG Subscription info" for the mobile station UE specified by the identification information of the mobile station UE included in the "HO Request", thereby performing "Accessibility Check" with respect to the mobile station UE.

In addition, the gateway device HeNB-GW may also accommodate the "UE CSG Subscription info" for the mobile station UE from the mobile switching center MME via the "HO Request", or may also accommodate the "UE CSG Subscription info" for the mobile station UE when an S1 connection is set between the gateway device HeNB-GW and the mobile switching center MME.

As illustrated in FIG. 10, in the mobile communication system according to the fifth modification, the radio base station HeNB2 includes the management unit 11 and the report unit 12, and the gateway device HeNB-GW includes the reception unit 21, the management unit 22, and a determination unit 24.

The reception unit 21 of the gateway device HeNB-GW is configured to accommodate the "UE CSG Subscription info" for the mobile station UE from the mobile switching center MME at a predetermined timing.

Furthermore, the reception unit 21 of the gateway device HeNB-GW is configured to accommodate eNB-IDs and CSG-IDs of the radio base stations HeNB2 and HeNB3 when an S1 connection is set between the accommodated radio base stations HeNB2 and HeNB3.

The management unit 22 of the gateway device HeNB-GW is configured to manage the "UE CSG Subscription info" for the mobile station UE and the "eNB-ID←→CSG-ID table" including the eNB-IDs and the CSG-IDs of the accommodated radio base stations HeNB2 and HeNB3.

The determination unit 23 of the gateway device HeNB-GW is configured to determine whether the mobile station UE is accessible to the radio base station HeNB2 based on the identification information of the mobile station UE and the eNB-ID of the radio base station HeNB2, which are included in the "HO Request" from the mobile switching center MME, with reference to the "eNB-ID←→CSG-ID table" and the "UE CSG Subscription info" for the mobile station UE, thereby performing the "Accessibility Check" with respect to the mobile station UE.

In the mobile communication system according to the fifth modification, it is possible for the gateway device HeNB-GW to perform the "Accessibility Check" with respect to the mobile station UE by using the "UE CSG Subscription info" for the mobile station UE reported by the mobile switching center MME and the "eNB-ID←→CSG-ID table" generated based on information from the accommodated radio base station HeNB.

(Sixth Modification)

In addition, the above-mentioned "UE CSG Subscription info" may be a list indicating identification information of the mobile station UE accessible for each CSG-ID.

Furthermore, in the above-mentioned description, the case where the "Accessibility Check" is performed when the mobile station UE is handed over from the cell subordinate to the radio base station eNB to the cell subordinate to the radio base station HeNB2 has been described as an example. However, the present invention is not limited to the above case. For example, the present invention can also be applied to a case where the "Accessibility Check" is performed when the mobile station UE is handed over from the cell subordinate to the radio base station HeNB2 to a CSG cell subordinate to the radio base station eNB, or a case where the "Accessibility Check" is performed when the mobile station UE is handed over from a cell subordinate to the radio base station HeNB1 to the cell subordinate to the radio base station HeNB2.

(Seventh Modification)

In the mobile communication systems according to the above-mentioned first embodiment and first to sixth modifications, the radio base station eNB (a handover source) may also be configured to manage an access mode of a cell subordinate to the radio base station HeNB which is a handover destination.

It is possible for the radio base station eNB (the handover source) to manage the access mode of the cell subordinate to the radio base station HeNB (the handover destination) as any one of "Closed" mode, "Hybrid" mode, and "Open" mode.

Here, in the "Closed" mode, an access right is given only to a mobile station UE belonging to CSG of a target cell.

In the "Hybrid" mode, communication with high quality is permitted for a mobile station UE belonging to the CSG of the target cell, and communication with best effort quality is permitted for mobile stations UEs other than the above mobile station UE.

In the "Open" mode, an access right is given to all mobile stations UEs, similarly to a macro cell.

Here, when the access mode of the cell subordinate to the radio base station HeNB (the handover destination) is the "Closed" mode or the "Hybrid" mode, the radio base station eNB (the handover source) may also be configured to determine that it is necessary to perform "Accessibility Check" with respect to a mobile station UE to be handed over. When the access mode of the cell subordinate to the radio base station HeNB (the handover destination) is the "Open" mode, the radio base station eNB may also be configured to determine that it is not necessary to perform the "Accessibility Check" with respect to the mobile station UE to be handed over.

In addition, the radio base station eNB (the handover source) may also be configured to put a bit indicating the necessity of the "Accessibility Check" into the above-mentioned "HO Required", and transmit the "HO Required" to the mobile switching center MME.

Here, the radio base station eNB (the handover source) may also be configured to determine the access mode of the cell subordinate to the radio base station HeNB (the handover destination) based on the PCI included in the "Measurement Report" and the like, which has been transmitted from the mobile station UE.

In such a case, the range of PCI of the "Closed" mode, the range of PCI of the "Hybrid" mode, and the range of PCI of the "Open" mode may also be separately defined.

Here, a node configured to perform "Accessibility Check" of the mobile switching center MME, the gateway device HeNB-GW, the radio base station HeNB and the like may also be configured to perform determination regarding whether it is necessary to perform the "Accessibility Check" with respect to the above-mentioned mobile station UE to be handed over, based on the bit indicating the necessity of the above-mentioned "Accessibility Check".

Otherwise, the node configured to perform the "Accessibility Check" of the mobile switching center MME, the gateway device HeNB-GW, the radio base station HeNB and the like may also be configured to manage the access mode of the cell subordinate to the radio base station HeNB (the handover destination) in the above-mentioned "eNB-ID←→CSG-ID table" and the like, and perform determination regarding whether it is necessary to perform the "Accessibility Check" with respect to the above-mentioned mobile station UE to be handed over.

The characteristics of the present embodiment described above may be expressed as follows.

A first characteristic of the present embodiment is summarized in that a mobile communication method includes: a step of a mobile switching center MME managing "UE CSG Subscription info (access information)" for a mobile station UE, which defines CSG-ID (radio base station group identification information) accessible by the mobile station UE; a step of the mobile switching center MME accommodating "eNB-ID←→CSG-ID table" including a combination (entry) of eNB-ID (identification information) and CSG-ID of a radio base station HeNB2 (a second radio base station) from a gateway device HeNB-GW accommodating a radio base station HeNB2; a step of, when a radio base station eNB (a first radio base station) decides a handover of the mobile station UE from a cell subordinate to the radio base station eNB to a cell subordinate to the radio base station HeNB2, the radio base station eNB transmitting "HO Required (a handover request signal)" including identification information of the mobile station UE and the eNB-ID of the radio base station HeNB2 to the mobile switching center MME; and a step of the mobile switching center MME determining whether the mobile station UE is accessible to the radio base station HeNB2 based on the identification information of the mobile station UE and the eNB-ID of the radio base station HeNB2, which are included in the "HO Required", with reference to the "UE CSG Subscription info" for the mobile station UE and the "eNB-ID←→CSG-ID table".

A second characteristic (the first modification) of the present embodiment is summarized in that a mobile communication method includes: a step a mobile switching center MME managing "UE CSG Subscription info" for a mobile station UE; a step of, when a radio base station eNB decides a handover of the mobile station UE from a cell subordinate to the radio base station eNB to a cell subordinate to a radio base station HeNB2, the radio base station eNB transmitting "HO Required" including identification information of the mobile station UE and CSG-ID of the radio base station HeNB2 to the mobile switching center MME; and a step of the mobile switching center MME determining whether the mobile station UE is accessible to the radio base station HeNB based on the identification information of the mobile station UE and the CSG-ID of the radio base station HeNB2, which are included in the received "HO Required", with reference to the "UE CSG Subscription info" for the mobile station UE.

A third characteristic (the second modification) of the present embodiment is summarized in that a mobile communication method includes: a step of a mobile switching center MME managing "UE CSG Subscription info" for a mobile station UE; a step of, when a radio base station eNB decides a handover of the mobile station UE from a cell subordinate to the radio base station eNB to a cell subordinate to a radio base station HeNB2, the radio base station eNB transmitting "HO Required" including identification information of the mobile station UE and eNB-ID of the radio base station HeNB2 to the mobile switching center MME; a step of the mobile switching center MME transmitting "HO Request (a handover request signal)" to the radio base station HeNB2 via a gateway device HeNB-GW; a step of the radio base station HeNB2 notifying the mobile switching center MME of CSG-ID of the radio base station HeNB2 via the gateway device HeNB-GW in response to the received "HO Request"; and a step of the mobile switching center MME determining whether the mobile station UE is accessible to the radio base station HeNB2 based on the identification information of the mobile station UE included in the received "HO Request" and the notified CSG-ID of the radio base station HeNB2 with reference to the "UE CSG Subscription info" for the mobile station UE.

A fourth characteristic (the third modification) of the present embodiment is summarized in that a mobile communication method includes: a step of a mobile switching center MME notifying the radio base station eNB of "UE CSG Subscription info" for a mobile station UE; and a step of, when a radio base station eNB decides a handover of the mobile station UE from a cell subordinate to the radio base station eNB to a cell subordinate to a radio base station HeNB2, the radio base station eNB determining whether the mobile station UE is accessible to the radio base station HeNB2 with reference to the "UE CSG Subscription info" for the mobile station UE.

A fifth characteristic (the fourth modification) of the present embodiment is summarized in that a mobile communication method includes: a step of, when a radio base station eNB decides a handover of a mobile station UE from a cell subordinate to the radio base station eNB to a cell subordinate to a radio base station HeNB2, the radio base station eNB transmitting "HO Request" including identification information of the mobile station UE to the mobile switching center MME; a step of the mobile switching center MME transmitting a handover request signal "HO Request" including "UE CSG Subscription info" for the mobile station UE and the identification information of the mobile station UE to the radio base station HeNB2 via a gateway device HeNB-GW; and a step of the radio base station HeNB2 determining whether the mobile station UE is accessible to the radio base station HeNB2 based on the identification information of the mobile station UE included in the handover request signal "HO Request" and managed CSG-ID of the radio base station HeNB2 with reference to the "UE CSG Subscription info" for the mobile station UE, which is included in the received "HO Request".

A sixth characteristic (the fifth modification) of the present embodiment is summarized in that a mobile communication method includes: a step of a gateway device HeNB-GW accommodating an "eNB-ID←→CSG-ID table" including a combination of eNB-ID and CSG-ID of a radio base station HeNB2 from the radio base station HeNB2, and accommodating "UE CSG Subscription info" for a mobile station UE from a mobile switching center MME; a step of, when a radio base station eNB decides a handover of the mobile station UE from a cell subordinate to the radio base station eNB to a cell subordinate to the radio base station HeNB2, the radio base station eNB transmitting "HO Required" including identification information of the mobile station UE and the eNB-ID of the radio base station HeNB2 to the mobile switching center MME; a step of the mobile switching center MME transmitting "HO Request" including the identification information of the mobile station UE and the eNB-ID of the radio base station HeNB2 to the gateway device HeNB-GW; and a step of the gateway device HeNB-GW determining whether the mobile station UE is accessible to the radio base station HeNB2 based on the identification information of the mobile station UE the eNB-ID of the radio base station HeNB2, which are included in the received "HO Request", with reference to the "eNB-ID←→CSG-ID table" and the "UE CSG Subscription info" for the mobile station UE.

A seventh characteristic of the present embodiment is summarized in that a mobile communication method includes: a step of, when a radio base station eNB decides a handover of a mobile station UE from a cell subordinate to the radio base station eNB to a cell subordinate to a radio base station HeNB2 accommodated in a gateway device HeNB-GW, the radio base station eNB deciding whether to determine whether the mobile station UE is accessible to the radio base station HeNB2 (whether to perform "Accessibility Check" with respect to the mobile station UE) based on an access mode (a "Closed" mode, a "Hybrid" mode, and an "Open" mode) of the radio base station HeNB2.

It is noted that the operation of the above-described the radio base station eNB/HeNB, the mobile station UE, the gateway device HeNB-GW or the mobile switching center MME may be implemented by a hardware, may also be implemented by a software module executed by a processor, and may further be implemented by the combination of the both.

The software module may be arranged in a storage medium of an arbitrary format such as RAM(Random Access Memory), a flash memory, ROM (Read Only Memory), EPROM (Erasable Programmable ROM), EEPROM (Electronically Erasable and Programmable ROM), a register, a hard disk, a removable disk, and CD-ROM.

The storage medium is connected to the processor so that the processor can write and read information into and from the storage medium. Such a storage medium may also be accumulated in the processor. The storage medium and processor may be arranged in ASIC. Such the ASIC may be arranged in the radio base station eNB/HeNB, the mobile station UE, the gateway device HeNB-GW or the mobile switching center MME. Further, such a storage medium or a processor may be arranged, as a discrete component, in the radio base station eNB/HeNB, the mobile station UE, the gateway device HeNB-GW or the mobile switching center MME.

Thus, the present invention has been explained in detail by using the above-described embodiments; however, it is obvious that for persons skilled in the art, the present invention is not limited to the embodiments explained herein. The present invention can be implemented as a corrected and modified mode without departing from the gist and the scope of the present invention defined by the claims. Therefore, the description of the specification is intended for explaining the example only and does not impose any limited meaning to the present invention.

The invention claimed is:

1. A mobile communication method, comprising:
a step of a mobile switching center managing access information for defining an accessible Closed Subscriber Group (CSG) ID of a mobile station;
a step of a first radio base station transmitting, upon deciding to perform a handover of the mobile station from a cell subordinate to the first radio base station to a cell subordinate to a second radio base station accommodated in a gateway device, a handover request signal including identification information of the mobile station and a Closed Subscriber Group (CSG) ID of the second radio base station to the mobile switching center; and
a step of the mobile switching center determining whether the mobile station can access the second radio base station based on the identification information of the mobile station and the Closed Subscriber Group (CSG) ID of the second radio base station included in the handover request signal, with reference to the access information.

2. A mobile communication system comprising:
a mobile switching center;
a first radio base station;
a second radio base station; and
a gateway device, wherein
the mobile switching center is configured to manage access information for defining an accessible Closed Subscriber Group (CSG) ID of a mobile station;
the first radio base station is configured to transmit, upon deciding to perform a handover of the mobile station from a cell subordinate to the first radio base station to a cell subordinate to the second radio base station accommodated in a gateway device, a handover request signal including identification information of the mobile station and a Closed Subscriber Group (CSG) ID of the second radio base station to the mobile switching center; and
the mobile switching center is configured to determine whether the mobile station can access the second radio base station based on the identification information of the mobile station and the Closed Subscriber Group (CSG) ID of the second radio base station included in the handover request signal, with reference to the access information.

3. A mobile communication method, comprising:

a step of a mobile switching center transmitting a handover request signal, via a gateway device accommodating a second radio base station, to the second radio base station; and a step of the second radio base station determining, based on a Closed Subscriber Group (CSG) ID included in the received handover request signal and a Closed Subscriber Group (CSG) ID of the managed second radio base station, whether a mobile station can access the second radio base station.

4. A mobile communication system comprising:

a mobile switching center;

a second radio base station; and a gateway device, wherein the mobile switching center is configured to transmit a handover request signal, via the gateway device accommodating the second radio base station, to the second radio base station; and the second radio base station is configured to determine, based on a Closed Subscriber Group (CSG) ID included in the received handover request signal and a Closed Subscriber Group (CSG) ID of the managed second radio base station, whether a mobile station can access the second radio base station.

* * * * *